United States Patent
Dogiamis et al.

(10) Patent No.: US 10,277,322 B2
(45) Date of Patent: Apr. 30, 2019

(54) CHANNELIZATION FOR DISPERSION LIMITED WAVEGUIDE COMMUNICATION CHANNELS

(71) Applicant: Intel Corporation, Santa Clara, CA (US)

(72) Inventors: Georgios C. Dogiamis, Chandler, AZ (US); Sasha N. Oster, Chandler, AZ (US); Telesphor Kamgaing, Chandler, AZ (US); Emanuel Cohen, Zichron Yaacov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/965,637

(22) Filed: Apr. 27, 2018

(65) Prior Publication Data

US 2018/0316434 A1    Nov. 1, 2018

Related U.S. Application Data

(63) Continuation of application No. 15/388,383, filed on Dec. 22, 2016, now Pat. No. 9,960,849.

(51) Int. Cl.
*H04B 10/00* (2013.01)
*H04B 10/2575* (2013.01)
*H04B 10/2513* (2013.01)
*H04J 14/00* (2006.01)

(52) U.S. Cl.
CPC ..... *H04B 10/2575* (2013.01); *H04B 10/2513* (2013.01)

(58) Field of Classification Search
CPC ...... H04B 3/52; H04B 3/462; H04B 10/2575; H04B 10/25759; H04B 10/90
See application file for complete search history.

(56) References Cited

U.S. PATENT DOCUMENTS

| 2005/0014472 | A1  | 1/2005  | Cox et al. |
| 2005/0239428 | A1  | 10/2005 | Seendripu et al. |
| 2011/0051780 | A1* | 3/2011  | Kawasaki ............... H04B 1/40 375/135 |

(Continued)

OTHER PUBLICATIONS

International Search Report and Written Opinion dated Mar. 7, 2018 for International Application No. PCT/US2017/062872, 14 pages.

(Continued)

*Primary Examiner* — Daniel G Dobson
(74) *Attorney, Agent, or Firm* — Schwabe, Williamson & Wyatt, P.C.

(57) ABSTRACT

Embodiments of the present disclosure may relate to a transmitter to transmit a radio frequency (RF) signal to a receiver via a dielectric waveguide where the transmitter includes a plurality of mixers to generate modulated RF signals and a combiner to combine the modulated RF signals. Embodiments may also include a receiver to receive, from a dielectric waveguide, a RF signal where the receiver includes a splitter to split the RF signal into a plurality of signal paths, a plurality of filters, and a plurality of demodulators. Embodiments may also include a dielectric waveguide communication apparatus that may include the transmitter and the receiver. Other embodiments may be described and/or claimed.

19 Claims, 7 Drawing Sheets

(56) References Cited

U.S. PATENT DOCUMENTS

2011/0261737 A1 10/2011 Desai et al.
2013/0176171 A1 7/2013 Webber et al.
2016/0322691 A1 11/2016 Bennett et al.

OTHER PUBLICATIONS

Non-Final Office Action dated Aug. 9, 2017 for U.S. Appl. No. 15/388,383, 12 pages.
Notice of Allowance dated Dec. 27, 2017 for U.S. Appl. No. 15/388,383, 5 pages.

* cited by examiner

CHANNELIZATION FOR DISPERSION LIMITED WAVEGUIDE COMMUNICATION CHANNELS

CROSS REFERENCE TO RELATED APPLICATION

This application is a continuation of U.S. patent application Ser. No. 15/388,383, entitled "CHANNELIZATION FOR DISPERSION LIMITED WAVEGUIDE COMMUNICATION CHANNELS," filed on Dec. 22, 2016, and claims priority to the Ser. No. 15/388,383 application. The entire disclosure of the Ser. No. 15/388,383 application is incorporated herein by reference.

FIELD

Embodiments of the present disclosure generally relate to the field of communication over dielectric waveguides and, more particularly, to frequency channelization for dispersion limited waveguide communication channels.

BACKGROUND

As increasing numbers of devices become interconnected and users consume more data, the demand on servers to provide that data may continue to grow. These demands may include, for example, increased data rates, switching architectures with longer interconnects, reduced cost, and power competitive solutions.

For medium range transmission in servers and high performance computers, dielectric waveguides operating in the millimeter (mm)-wave frequency range may provide a performance and/or cost advantage with respect to optical and/or electrical fabrics. As used herein, "medium range" may refer to transmission ranges of approximately 1 to approximately 5 meters (m). The desired data rate at a mm-wave frequency range may be achieved by taking advantage of available frequency bandwidth. For example, a radio or transceiver operating over a 40 Gigahertz (GHz) bandwidth from 100 GHz to 140 GHz may deliver data rates of approximately 40 Gigabits per second (Gbps) with a quadrature phase shift keying (QPSK) modulation scheme. The same radio may deliver up to 80 Gbps over the same frequency range if a quadrature amplitude modulation 16 (QAM16) modulation scheme is used.

In radio-over-waveguide applications, where radio waves are transmitted through a dielectric waveguide, a single mode waveguide operating over a broad frequency range may experience varying group delay response as a function of the frequency over medium range. This chromatic dispersion may result in inter-symbol interference, as digital signals carried on different wavelengths travel at different speeds through the same waveguide.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure may relate to a transmitter to transmit a radio frequency (RF) signal to a receiver via a dielectric waveguide. In embodiments, the transmitter may include a plurality of mixers to generate modulated RF signals in a plurality of frequency channels and a combiner to combine the modulated RF signals for transmission over the dielectric waveguide. Embodiments may also include a receiver to receive, from a dielectric waveguide, an RF signal over a channelized RF bandwidth. In embodiments, the receiver may include a splitter to split the RF signal into a plurality of signal paths, a plurality of filters, and a plurality of demodulators. Some embodiments may include a dielectric waveguide communication apparatus that includes the transmitter and the receiver.

In various embodiments, use of a transmitter to channelize RF signals over an available frequency bandwidth and/or use of a receiver to recover data from the channelized RF signals may reduce and/or eliminate the effects of chromatic dispersion in the dielectric waveguide, may allow a higher data rate through the dielectric waveguide than systems using non-channelized communication, and/or may allow dispersion compensators with lower power consumption requirements to be used in the transmitter and/or receiver.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first layer formed, deposited, or otherwise disposed on a second layer" may mean that the first layer is formed, deposited, grown, bonded, or otherwise disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
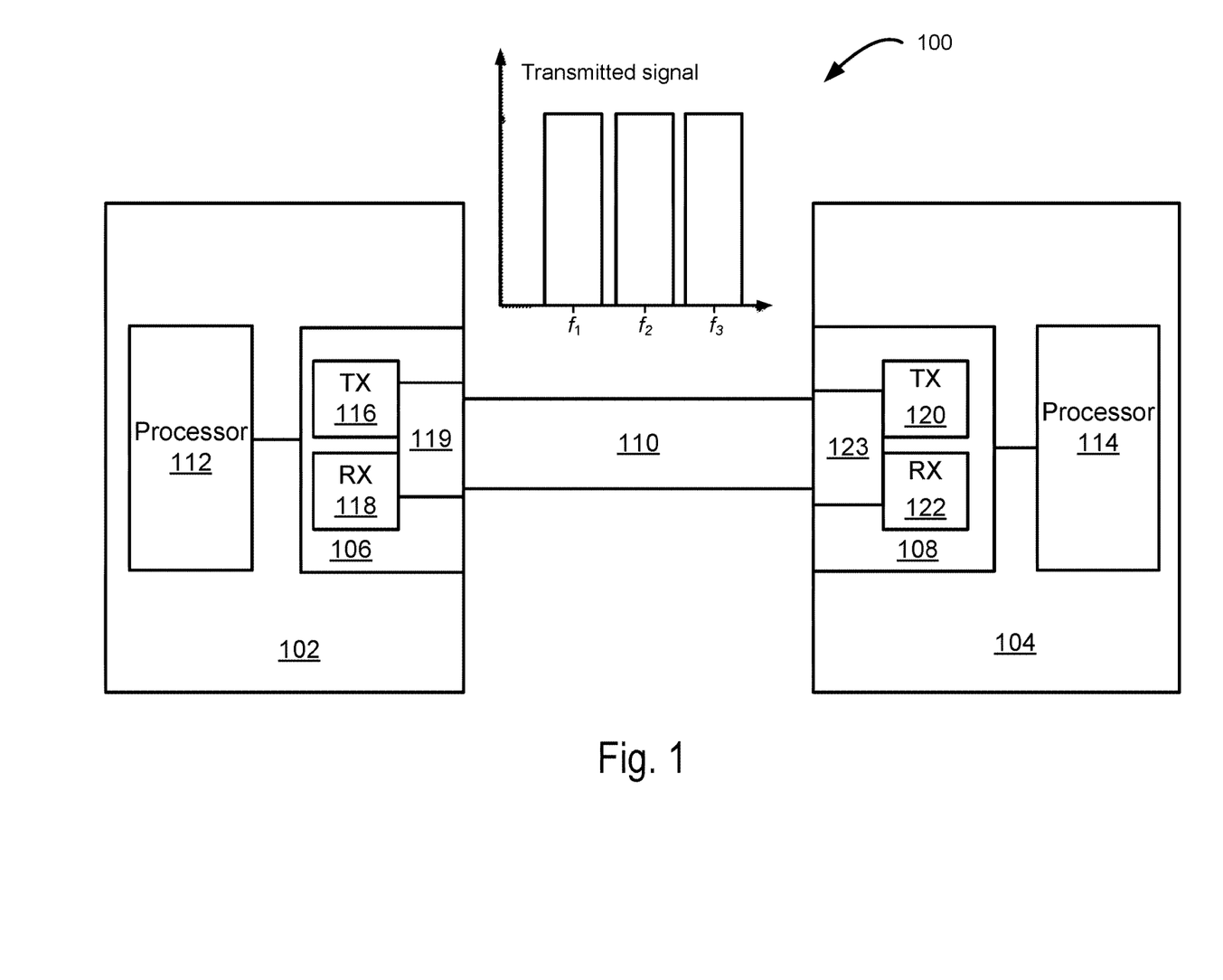
FIG. 1 depicts a block diagram of a system with transceivers to transmit and receive channelized signals over a dielectric waveguide, in accordance with various embodiments.

FIG. 1 depicts a system 100 having a first electronic device 102 and a second electronic device 104 that may include a first transceiver 106 and a second transceiver 108, respectively, to transmit and receive channelized signals over a dielectric waveguide 110, in accordance with various embodiments. In some embodiments, the dielectric waveguide 110 may be referred to as a "physical channel". However, it should be understood that a physical waveguide channel is different than the frequency channels used for channelized signal transmission over the dielectric waveguide 110. In some embodiments, the first electronic device 102 may include a first processor 112 coupled with the first transceiver 106 and the second electronic device 104 may include a second processor 114 coupled with the second transceiver 108. In various embodiments, the first electronic device 102 and/or the second electronic device 104 may be a computing device such as a blade server in a data center, a networking device such as a switch or router, or some other electronic device that transmits and/or receives data.

In some embodiments, the first transceiver 106 may include a first transmitter 116 and a first receiver 118. In various embodiments, the first transmitter 116 may be configured to receive one or more data signals from a data source such as the first processor 112. In some embodiments, the first transmitter 116 may generate a channelized signal having two or more frequency channels that may be in distinct non-overlapping frequency bands and may modulate a signal to be transmitted in each channel based at least in part on the received one or more data signals. As shown, the transmission signal spectrum may include three frequency channels, with the first channel having a first center frequency, $f_1$, the second channel having a second center frequency, $f_2$, and the third channel having a third center frequency, $f_3$. Although three frequency channels are shown, a different number of channels may be used in other embodiments. In some embodiments, at least two frequency channels but less than or equal to five frequency channels may be used. In other embodiments, more than five frequency channels may be used. In various embodiments, the first receiver 118 may be configured to receive a channelized signal over the dielectric waveguide 110 and process (e.g., convert, demodulate, amplify, filter, etc.) the channelized signal to recover data that may then be provided to another component such as the processor 112.

In some embodiments, the first transceiver 106 may include a first waveguide interface 119 coupled with the first transmitter 116 and the first receiver 118. In various embodiments, the first waveguide interface 119 may be configured to allow the first transmitter 116 and the first receiver 118 to simultaneously transmit and receive over the waveguide 110. In some embodiments, the first transceiver 106 may include more than one waveguide interface, or may not include a waveguide interface component separate from the first transmitter 116 and/or the first receiver 118.

Similarly, the second transceiver 108 may include a second transmitter 120 and a second receiver 122 that may operate in similar fashion to that described with respect to the first transmitter 116 and the first receiver 118, respectively. In various embodiments, the first transceiver 106 may communicate with the second transceiver 108 over a single dielectric waveguide 110 and may be able to simultaneously receive and transmit over the dielectric waveguide 110. In some embodiments, the first transceiver 106 may communicate with the second transceiver 108 over a different number of dielectric waveguides (not shown for clarity), such as over two waveguides, with a first dielectric waveguide coupling the first transmitter 116 to the second receiver 122 for communication from the first transceiver 106 to the second transceiver 108, and a second dielectric waveguide coupling the first receiver 118 to the second transmitter 120 for communication from the second transceiver 108 to the first transceiver 106.

In some embodiments, the second transceiver 108 may include a second waveguide interface 123 coupled with the second transmitter 120 and the second receiver 122. In various embodiments, the second waveguide interface 123 may be configured to allow the second transmitter 120 and the second receiver 122 to simultaneously transmit and receive over the waveguide 110. In some embodiments, the second transceiver 108 may include more than one waveguide interface, or may not include a waveguide interface component separate from the second transmitter 120 and/or the second receiver 122.

In various embodiments, the first transceiver 106 and the second transceiver 108 may communicate over the dielectric waveguide 110 in a radio frequency (RF) frequency range that may be, for example, between approximately 30 GHz and approximately 300 GHz. In some embodiments, this RF frequency range may be described as a millimeter (mm)-wave frequency range. In various embodiments, the RF frequency range used for communication over the dielectric waveguide may extend upwards beyond 300 GHz into the sub-terahertz (THz) range to below approximately 1 THz.

The dielectric waveguide 110 may include a plurality of different dielectric layers with different refractive indices. For example, the dielectric waveguide 110 may be composed of three different dielectric layers. The refractive indices of the layers of the dielectric waveguide 110 may be selected such that the RF signal transmitted through the dielectric waveguide 110 may generally reflect within, and propagate through, the dielectric waveguide 110 without incurring significant signal loss. In some embodiments, the dielectric waveguide 110 may be a metal coated dielectric waveguide. In various embodiments, the dielectric waveguide 110 may be a single-material dielectric waveguide with or without a metal coating that may be used as a waveguide physical channel.

In embodiments, the example system 100 may be an element of a server. For example, the first electronic device 102 may be an element of one rack of a server, and the second electronic device 104 may be an element of another rack of the server. In some embodiments, the first electronic device 102 and the second electronic device 104 may be elements of the same rack (e.g., within rack interconnect). In other embodiments, the first transceiver 106 may be an element of one server, and the second transceiver 108 may be an element of another server. These are intended only as example configurations, and in other configurations the first transceiver 106 and/or the second transceiver 108 may be elements of some other type of server, computing device, mobile device, laptop, desktop, data center, or some other electronic device. In some embodiments, the dielectric waveguide 110 may have a length of between approximately 1 meter (m) and 5 m, but may have a different length in other embodiments. In various embodiments, the first processor 112 and the first transceiver 106 may be included on a common substrate of the first electronic device 102 and/or the second processor 114 and the second transceiver 108 may be included on a common substrate of the second electronic device 104.

Figure 2:
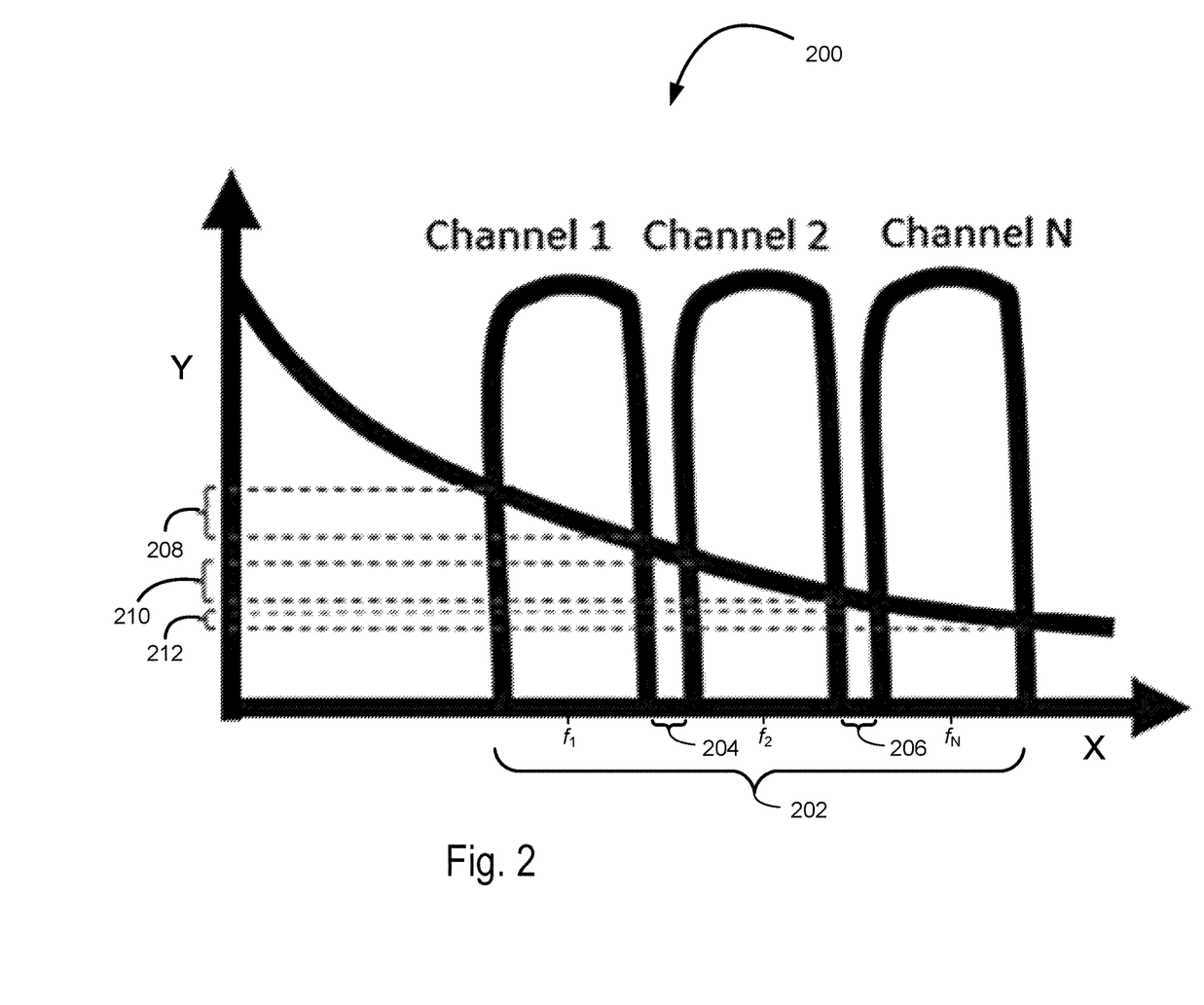
FIG. 2 depicts an example dispersion graph associated with a dielectric waveguide showing channels superimposed, in accordance with various embodiments.

FIG. 2 is a dispersion graph 200 depicting an example of chromatic dispersion in a dielectric waveguide such as dielectric waveguide 110, showing channels superimposed, in accordance with various embodiments. The Y axis depicts delay, which may be measured in nanoseconds (ns) and the X axis depicts frequency, which may be measured in Gigahertz (GHz) in accordance with some embodiments. As can be seen, signals at a higher frequency may experience less delay than signals at a lower frequency due to a phenomenon known as chromatic dispersion where the phase velocity of an electromagnetic wave depends on its frequency, resulting in signals of different frequencies propagating through a medium such as the dielectric waveguide 110 at different speeds.

The chromatic dispersion may become significant in dielectric waveguides such as dielectric waveguide 110 that have a length in the approximately 1 to approximately 5 m range. Specifically, the signal sent by the first transmitter 116 or the second transmitter 120 may be relatively well defined with respect to a time axis. However, as the signal propagates through the dielectric waveguide 110, the signal may spread along the time axis because the higher frequencies may travel at a faster rate than the lower frequencies. When the signal arrives at the second receiver 122 or the first receiver 118, respectively, the signal may have spread significantly. This spread may make it difficult for the second receiver 122 or the first receiver 118 to identify where the received signal begins or ends. If multiple signals are transmitted in adjacent time slots, the signals may also start to overlap with one another such that identification of an individual signal may become difficult for the second receiver 122 or the first receiver 118.

In various embodiments, to mitigate the effects of chromatic dispersion, an available frequency bandwidth 202 may be subdivided into a plurality of channels, shown as channel 1, channel 2, and channel N having center frequencies $f_1$, $f_2$, and $f_N$, respectively. In some embodiments, each of the channels may have a frequency bandwidth approximately equal to the other channels. In other embodiments, one or more of the channels may differ from one or more of the other channels in frequency bandwidth. In some embodiments, frequency guard bands may separate any two adjacent channels, shown as a first frequency guard band 204 separating channel 1 and channel 2, and a second frequency guard band 206 separating channel 2 and channel N, where N is equal to three. In embodiments, generally stated, the last guard band may be between channel N−1 and channel N. In various embodiments, channel 1 may include a first group delay difference 208, channel 2 may include a second group delay difference 210, and channel N may include a third group delay difference 212. In embodiments, by channelizing the available frequency bandwidth 202, the group delay difference over the entire available bandwidth may be made more manageable for handling by compensation circuitry by splitting it into the smaller group delay differences for each channel.

As an example, in accordance with various embodiments, a 40 GHz available bandwidth with a single wideband channel versus subdivision into two channels may be considered. In the case of one wideband channel, the entire dispersion is incurred over the channel, which may be on the order of a few nanoseconds. This increases the demand of a dispersion compensation system, may result in a lower achievable data rate, and may have a corresponding difficulty in design and high power requirements due to the difficulty in achieving compensation for a group delay differential of a few nanoseconds. In the case of a channelized approach with a division into two channels, each of the channels will see approximately half of the total group delay difference. In various embodiments, this may enable a simpler compensation circuit with a higher achievable data rate and lower power requirements.

Figure 3:
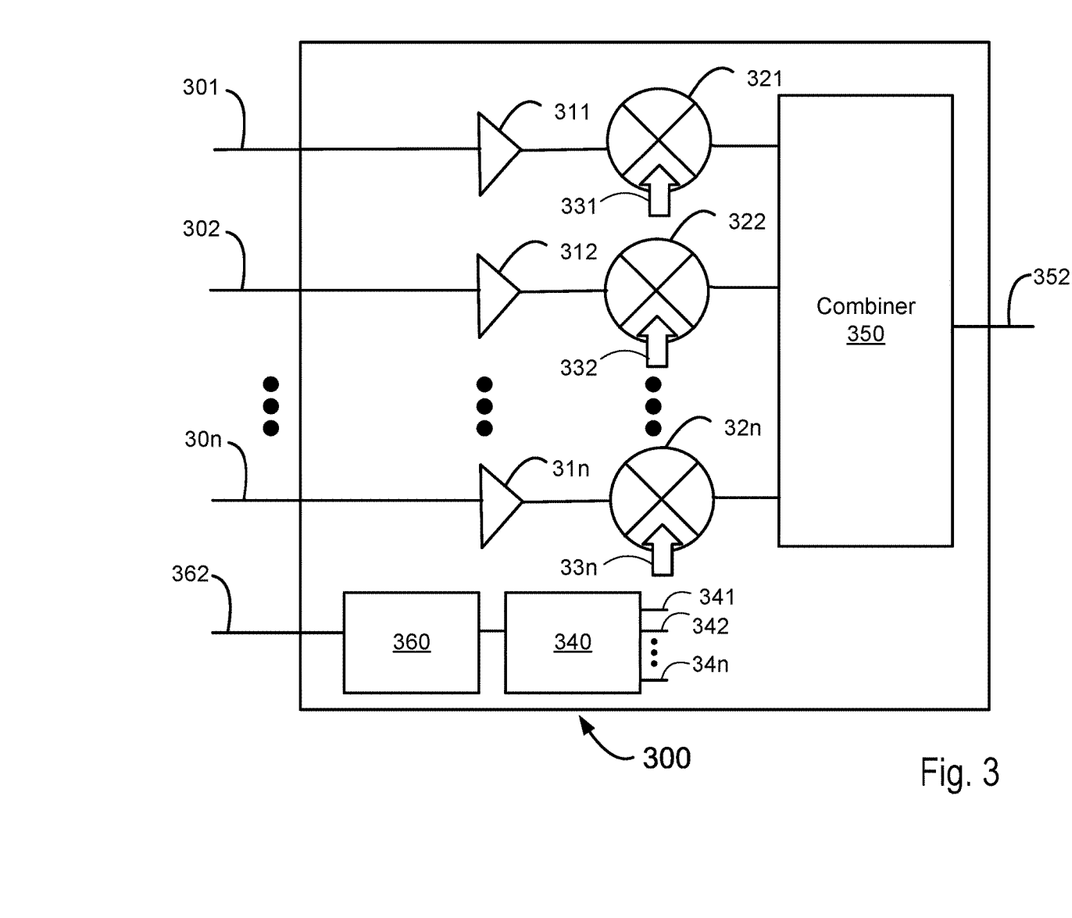
FIG. 3 is a block diagram of a transmitter to transmit channelized signals over a dielectric waveguide, in accordance with various embodiments.

FIG. 3 is a block diagram of a transmitter 300 to modulate data signal inputs onto a plurality of channelized signals, in accordance with various embodiments. In some embodiments, the transmitter 300 may be an implementation of the first transmitter 116 and/or the second transmitter 120 described with respect to FIG. 1. In various embodiments, the transmitter 300 may include n data signal inputs such as inputs 301, 302, 30n, etc. It should be understood that n inputs represents a general number of inputs, where various embodiments may have differing numbers of data signal inputs. In some embodiments, the signals may be received from an electronic device to which the transmitter 300 is physically, electronically, and/or communicatively coupled (e.g., first processor 112 or second processor 114). In various embodiments, the transmitter 300 may share the same housing as the electronic device, or be separate from the electronic device but communicatively coupled to the electronic device by the data signal inputs 301/302/30n.

In various embodiments, the transmitter 300 may include a plurality of components, such as amplifiers 311, 312, 31n, etc., each of which may receive one of the data signal inputs 301/302/30n to generate an amplified signal. In some embodiments, the transmitter 300 may include a plurality of mixers 321, 322, 32n, each of which may have a local oscillator signal input 331, 332, 33n, respectively to receive a signal from a local oscillator synthesizer. In various embodiments, the transmitter 300 may include a local oscillator synthesizer 340 to generate a plurality of local oscillator signals 341, 342, 34n, etc. that may be used as inputs to the local oscillator signal inputs 331, 332, 33n, respectively. In some embodiments, the mixers 321/322/32n may upconvert the incoming amplified data signals based at least in part on the local oscillator signals 341/342/34n. In various embodiments, the mixers 321/322/32n may include additional inputs (not shown for clarity) and/or may also be modulators that may modulate the upconverted RF signal with a modulation scheme such as binary phase-shift keying (BPSK), quadrature phase-shift keying (QPSK), 8 phase-shift keying (8-PSK), a pulse amplitude modulation (PAM) scheme (e.g., PAM4), a quadrature amplitude modulation (QAM) scheme (e.g., QAM16), or any other suitable modulation scheme.

In some embodiments, the transmitter 300 may include a combiner 350 that may receive the upconverted, modulated RF signals from the mixers 321/322/32n as inputs and combine the RF signals to produce a channelized output RF signal at an output 352 that may be coupled with the waveguide 110 for transmission of the channelized RF signal to another device. In various embodiments, some other component such as a multiplexer may be used in addition to, or in place of, the combiner 350. In some embodiments, the transmitter 300 may use a frequency division multiple access (FDMA) approach.

In various embodiments, the LO oscillator signals 341/342/34n output by the LO synthesizer 340 may be fixed frequencies used by the mixers 321/322/32n to upconvert the incoming signals from the amplifiers 311/312/31n to have the center frequencies $f_1$, $f_2$, $f_3$ shown in FIG. 1 or the center frequencies $f_1$, $f_2$, $f_N$ shown in FIG. 2. In some embodiments, the LO synthesizer 340 may be programmable such that the LO oscillator signals 341/342/34n may be changed in frequency and/or number. In embodiments, the LO synthesizer 340 may be programmable based at least in part on switching one or more capacitor banks on and/or off in response to one or more control signals.

In various embodiments, the transmitter 300 may include logic circuitry 360 coupled with the LO synthesizer 340 to direct the LO synthesizer 340 to generate the LO oscillator signals 341/342/34n based at least in part on a signal received at a LO control input 362. In some embodiments, the LO control input 362 may be a serial peripheral interface (SPI) bus coupled with a microcontroller (not shown for clarity) that may be included in the first electronic device 102 or the second electronic device 104. In other embodiments, the logic circuitry 360 may receive a signal at the LO control input 362 from the first processor 112 or the second processor 114. In some embodiments, the LO control input 362 may not be present and the logic circuitry 360 may direct the LO synthesizer 340 based on circuitry and/or modules within the logic circuitry 360 without using control signals from an external input such as the LO control input 362. In various embodiments, the logic circuitry 360 may be or include a controller to direct the LO synthesizer 340 to generate a number of frequencies based at least in part on a total group delay over an available frequency bandwidth. In some embodiments, the number of channels for modulated RF signal transmission may be equal to the number of frequencies generated by the LO synthesizer 340.

It should be understood that the transmitter 300 is intended as an example and other configurations may be possible. For example, additional components such as filters, processors, etc. may be present in transmitter 300. In some embodiments, there may be more or fewer amplifiers than shown in FIG. 3. For example, in some embodiments a single amplifier may be shared among multiple signal lines, or a single signal line may be coupled with a plurality of amplifiers. In some embodiments a signal line may not include an amplifier. As used herein, a "signal line" with respect to the transmitter 300 may refer to the above-described transmission path of data received on an input such as input 301, 302, 30n, etc. Similarly, there may be more or fewer mixers than shown in FIG. 3. In some embodiments, the arrangement of the elements may be different than shown, for example, one or more mixers 321/322/32n may precede an amplifier 311/312/31n in a signal line. In embodiments, one or more of the described amplification, mixing, modulation, upconversion, combining, etc. may be performed by one or more circuitry, modules, logic, firmware, software, and/or hardware.

In embodiments, the frequency channelization may be selected or configured based on a characteristic of the dielectric waveguide 110. For example, the number and/or center frequencies of the LO signals generated by the LO synthesizer 340 may be preconfigured based on a known channel response or channel characteristic of the dielectric waveguide 110 such as the total dispersion over an available bandwidth. In other embodiments, the transmitter 300 may be configured to dynamically and/or periodically test the dielectric waveguide 110 to identify a characteristic of the dielectric waveguide 110 on which to base the frequency channelization parameters.

In various embodiments, the transmitter 300 may also include additional components such as one or more dispersion compensators, pre-emphasis circuits, pre-distortion circuits, digital trimming circuits, pulse shaping circuits, and/or other types of signal processing circuits not shown for clarity. Although some components, such as the logic circuitry 360 may be referred to as circuitry, it should be understood that the components of the transmitter 300 may be performed by one or more modules, logic, firmware, software, and/or hardware.

Figure 4:
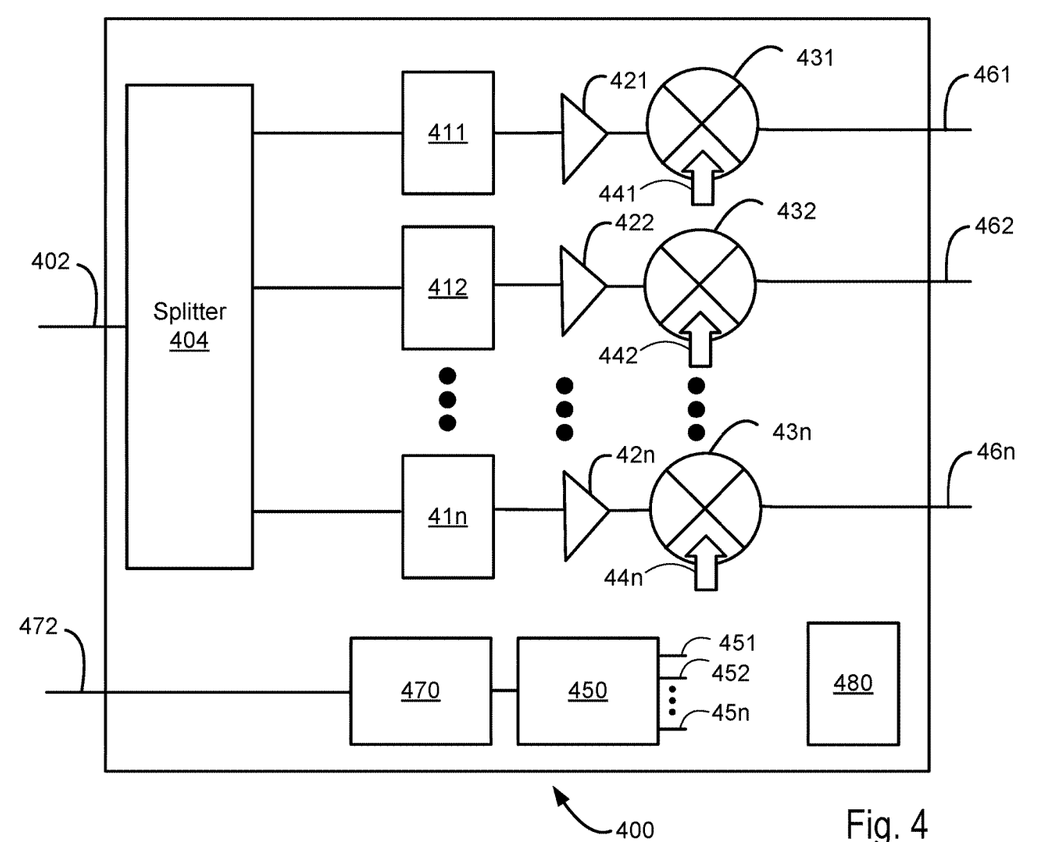
FIG. 4 is a block diagram of a receiver to receive channelized signals from a dielectric waveguide, in accordance with various embodiments.

FIG. 4 depicts a block diagram of a receiver 400, in accordance with various embodiments. In some embodiments, the receiver 400 may be an implementation of the first receiver 118 and/or the second receiver 122 described with respect to FIG. 1. In various embodiments, the receiver 400 may include an input 402 to be coupled with the dielectric waveguide 110. In some embodiments, the input 402 may receive, from the dielectric waveguide 110, a channelized, modulated, RF signal such as may be transmitted by the transmitter 300. In various embodiments, the receiver 400 may include a splitter 404 coupled with the input 402. In some embodiments, the splitter 404 may be a demultiplexer (e.g., diplexer, triplexer, etc.). In various embodiments, the splitter 404 may be configured to split a channelized RF signal from the input 402 into a plurality of RF signals on n different signal lines. In some embodiments, the number of signal lines generated by the splitter 404 may be the same as the number of signal lines propagating through the transmitter 300. Similarly to the use of the term with respect to the transmitter 300, the term "signal line" may refer to the transmission path of data through the receiver 400. More specifically, receiver 400 is shown as having n different signal lines.

In some embodiments, the receiver 400 may include a plurality of filters 411, 412, 41n, etc., each of which may receive one of the signal lines from the splitter 404 as an input. In some embodiments, the filters 411/412/41n may be band pass filters, each of which may be configured to pass RF signals in a predetermined frequency range. In other embodiments, one or more of the filters 411/412/41n may be programmable filters that may have a configurable frequency pass band or range that may be altered based at least in part on a filter control signal at a filter control signal input (not shown for clarity). In some embodiments, the splitter 404 and the filters 411/412/41n may be included in a demultiplexer (e.g., diplexer, triplexer, etc.). In various embodiments, the receiver 400 may include other components, such as amplifiers 421, 422, 42n to amplify signals from the filters 411/412/41n. In some embodiments, the receiver may include a plurality of demodulators 431, 432, 43n, etc. to demodulate and downconvert signals from the amplifiers 421/422/42n based at least in part on a signal received at a local oscillator input 441/442/44n, respectively. In various embodiments, one or more of the demodulators 431/432/43n may include or be a mixer. In some embodiments where the splitter 404 and filters 411/412/41n are included in a demultiplexer, the receiver 400 may include one or more additional filters, not shown for clarity.

In some embodiments, the receiver 400 may include a local oscillator synthesizer 450 to generate a plurality of local oscillator signals 451, 452, 45n, etc. that may be used as inputs to the local oscillator inputs 441, 442, 44n, respectively. In some embodiments, the demodulators 431/432/43n may downconvert the amplified signals based at least in part on the local oscillator signals 451/452/45n and demodulate the signals to generate output signals 461, 462, 46n, etc. that may be provided to another component such as the first processor 112 or the second processor 114. In various embodiments, the demodulators 431/432/43n may include additional inputs and/or outputs (not shown for clarity). In various embodiments, the LO oscillator signals 451/452/45n output by the LO synthesizer 450 may be fixed frequencies used by the demodulators 431/432/43n to downconvert the incoming signals from the amplifiers 421/422/42n and/or the filters 411/412/41n. In some embodiments, the LO synthesizer 450 may be programmable such that the LO oscillator signals 451/452/45n may be changed in frequency and/or number. In embodiments, the LO synthesizer 450 and/or the filters 411/412/41n may be programmable based at least in part on switching one or more capacitor banks on and/or off in response to one or more control signals.

In various embodiments, the receiver 400 may include logic circuitry 470 coupled with the LO synthesizer 450 to direct the LO synthesizer 450 to generate the LO oscillator signals 451/452/45n based at least in part on a signal received at a LO control input 472. In some embodiments, the filters 411/412/41n may be programmable, with filtering characteristics such as a pass band based at least in part on a filter control signal generated by the logic circuitry 470. In various embodiments, the logic circuitry 470 may provide control signals to both the filters 411/412/41n and the LO synthesizer 450. In some embodiments, the LO control input 472 may be a SPI bus coupled with a microcontroller (not shown for clarity) that may be included in the first electronic device 102 or the second electronic device 104. In other embodiments, the logic circuitry 470 may receive a signal at the LO control input 472 from the first processor 112 or the second processor 114. In some embodiments, the LO control input 472 may not be present and the logic circuitry 470 may direct the LO synthesizer based on circuitry and/or modules within the logic circuitry 470 without using control signals from an external input such as the LO control input 472. In various embodiments, the logic circuitry 470 may be or include a controller coupled with the filters 411/412/41n to direct respective ones of the filters 411/412/41n to allow RF signals in a channel frequency range having a lower frequency and an upper frequency specified by the controller to pass through the filters 411/412/41n.

In some embodiments, the logic circuitry 470 may not be present and/or the LO synthesizer 450 and/or the filters 411/412/41n may receive control signals from logic circuitry located outside of the receiver 400. In some embodiments, the logic circuitry 470 and the logic circuitry 360 may be in a common location and/or may receive control signals from a common component. In embodiments, a single LO synthesizer may be used for both the LO synthesizer 340 and the LO synthesizer 450.

It should be understood that the receiver 400 is intended as an example and other configurations may be possible. For example, additional components such as filters, processors, etc. may be present in receiver 400. In some embodiments, there may be more or fewer filters or amplifiers than shown in FIG. 4. For example, in some embodiments a single amplifier may be shared among multiple signal lines, or a single signal line may be coupled with a plurality of amplifiers. In some embodiments a signal line may not include an amplifier. As used herein with respect to the receiver 400, a "signal line" may refer to the above-described reception path of a signal from the splitter 404 that is converted to output data signals at the outputs 461/462/46n. Similarly, there may be more or fewer demodulators than shown in FIG. 4. In some embodiments, the arrangement of the elements may be different than shown, for example, one or more demodulators 431/432/43n may precede an amplifier 431/432/43n in a signal line. In some embodiments, the receiver 400 may include a clock and data recovery (CDR) circuit 480 and may be configured to use the CDR circuit 480 in conjunction with the demodulators 431/432/43n to generate the output data signals at the outputs 461/462/46n. In embodiments, one or more of the described filtering, amplifying, demodulation, downconversion, etc. may be performed by one or more circuitry, modules, logic, firmware, software, and/or hardware.

In embodiments, the filter characteristics and/or the LO signals may be selected or configured based on a characteristic of the dielectric waveguide 110. In some embodiments, the filter characteristics and/or the LO signals may be selected or configured based at least in part on a signal from a transmitter such as the transmitter 300 indicating a channelization scheme used by the transmitter. In some embodiments, a transmission protocol may include a header indicating channelization scheme parameters. In various embodiments, the logic circuitry 470 may adjust one or more of the LO synthesizer 450 or one or more of the filters 411/412/41n based at least in part on the channelization scheme parameters received in the header from a transmitter such as the transmitter 300.

In various embodiments, the receiver 400 may also include additional components such as one or more dispersion compensators, clock and data recovery (CDR) circuits, equalization circuits, digital trimming circuits, pulse shaping circuits, and/or other types of signal processing circuits not shown for clarity. Although some components, such as the logic circuitry 470 may be referred to as circuitry, it should be understood that the components of the receiver 400 may be performed by one or more modules, logic, firmware, software, and/or hardware.

In various embodiments, the above described system 100, transmitter 300, and/or receiver 400 may present advantages to systems that use dielectric waveguides 110 in the 1 m to 5 m range to convey signals in the mm-wave range and/or sub-THz range. For example, the above-described architecture may help to achieve higher data rates than systems that do not channelize transmission signals to compensate for chromatic dispersion. Additionally, the use of a dielectric waveguide and/or a transceiver implementation that may use complementary metal oxide semiconductor (CMOS) technology for transmission of signals in the mm-wave and/or sub-THz range may present a cost advantage in comparison to optical interconnects and transceivers. In some embodiments, channelizing signals may also allow dispersion compensators with lower power requirements to be used than would be possible with a wideband transmission approach.

Figure 5:
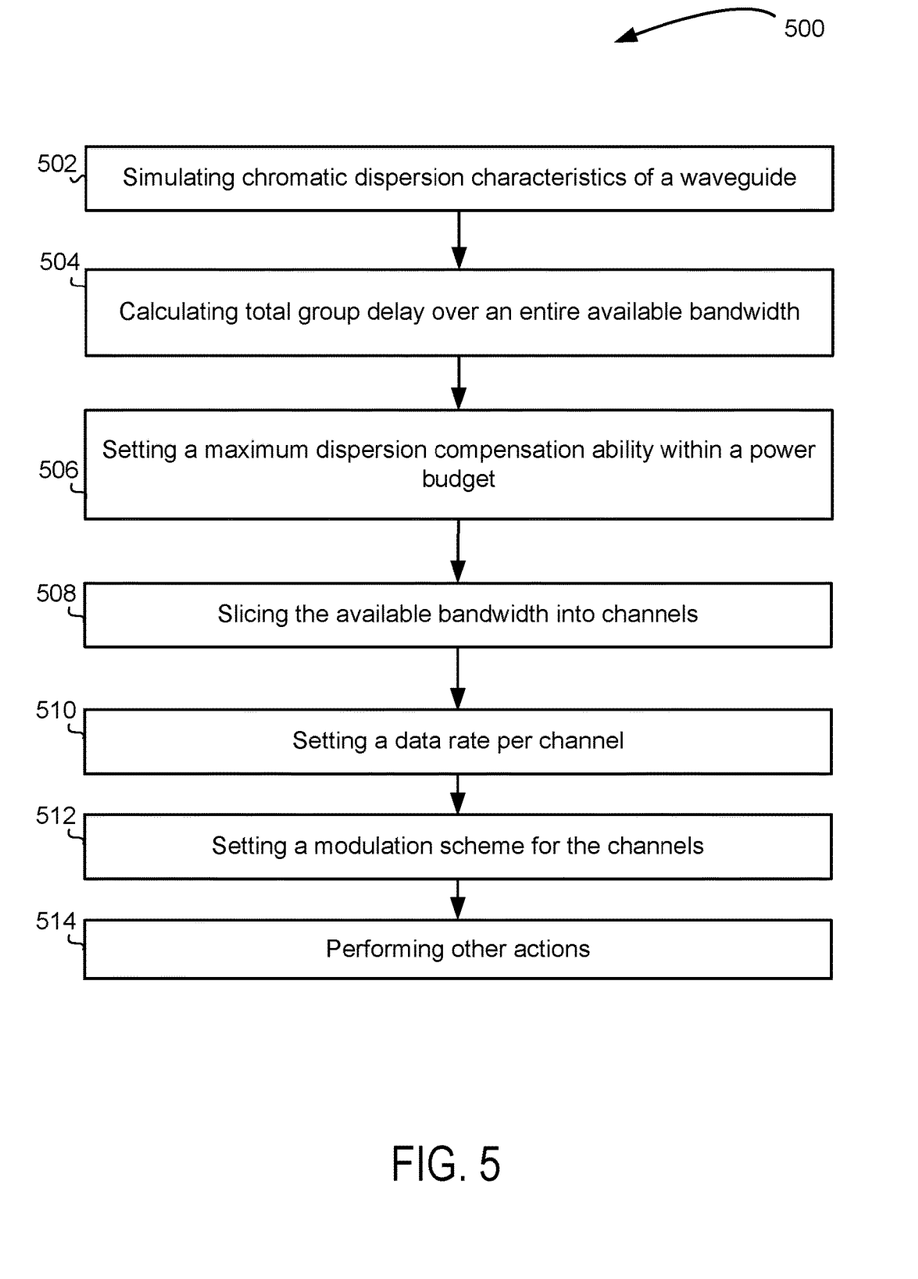
FIG. 5 is a flow diagram of a technique of channelizing a radio frequency signal to account for chromatic dispersion in a waveguide, in accordance with various embodiments.

FIG. 5 is a flow diagram of a technique 500 of channelizing a radio frequency signal to account for chromatic dispersion in a waveguide, in accordance with various embodiments. In embodiments, some or all of the technique 500 may be practiced by components shown and/or described with respect to the first electronic device 102 or the second electronic device 104 of FIG. 1; the transmitter 300 of FIG. 3; the receiver 400 of FIG. 4; and/or the computing device 600 of FIG. 6.

In various embodiments, the technique 500 may include simulating chromatic dispersion characteristics of a waveguide (e.g., waveguide 110 at a block 502. In some embodiments, simulating chromatic dispersion characteristics of the waveguide at the block 502 may include simulating the chromatic dispersion characteristics based at least in part on a length of the waveguide and/or include simulating chromatic dispersion characteristics on a predefined unit length basis. In various embodiments, the technique 500 may include calculating a total group delay over an entire available bandwidth (e.g., total group delay over the available frequency bandwidth 202 of FIG. 2) at a block 504. In some embodiments, the total group delay may range from approximately 0.5 nanoseconds to approximately 5 nanoseconds. In other embodiments, the total group delay range may extend lower and/or higher. In some embodiments, the technique 500 may include setting a maximum dispersion compensation ability within a predefined power budget at a block 506. In various embodiments, the maximum dispersion compensation ability may be a circuit-based dispersion compensation ability based at least in part on a capability of one or more dispersion compensation circuits that may be included in the first transceiver 110 and/or the second transceiver 118.

In some embodiments, the technique 500 may include slicing the available bandwidth into channels at a block 508. In various embodiments, slicing the available bandwidth into channels at the block 508 may include subdividing the available bandwidth into N channels based at least in part on one or more of simulating chromatic dispersion characteristics at the block 502, calculating total group delay at the block 504, and/or setting a maximum dispersion compensation ability at the block 506. In some embodiments, slicing the available bandwidth into channels at the block 508 may also include establishing one or more frequency guard bands (e.g., first frequency guard band 204, second frequency guard band 206). In various embodiments, establishing one or more frequency guard bands may allow efficient filtering of one or more channels at the receiver and may relax the filter specifications in the receiver. In some embodiments, slicing the available bandwidth into channels at the block 508 may include setting a size and/or frequency bandwidth of each channel to ensure there is not a greater group delay within each channel than can be compensated for by dispersion compensators in the transmitter and/or receiver.

In some embodiments, the technique 500 may include setting a data rate per channel at a block 510. In various embodiments, setting the data rate per channel at the block 510 may be based at least in part on a desired or specified total data rate and the number of channels, N, determined at the block 508. In some embodiments, the technique 500 may include setting a modulation scheme for the channels at a block 512. In various embodiments, setting the modulation scheme at the block 512 may include setting a modulation order based at least in part on the data rate per channel set at the block 510 and/or the bandwidth of the channels established at the block 508. In some embodiments, setting the modulation scheme at the block 512 may include calculating the modulation order based at least in part on the presence and/or type of echo cancellation or polarization used in transmission. In various embodiments, the technique 500 may include performing other actions at a block 514. In some embodiments, the other actions may include providing a control signal to one or more of the logic circuitry 360 and/or the logic circuitry 470 to configure one or more of the LO synthesizer 340, the LO synthesizer 450, and/or the filters 411/412/41n. In embodiments, one or more of the actions performed at one or more of the blocks 502, 504, 506, 508, 510, and/or 512 may be performed by one or more of the processor 112, the processor 114, logic circuitry 360, logic circuitry 470, and/or a microcontroller or other component coupled with the control input 362 and/or the control input 472.

Figure 6:
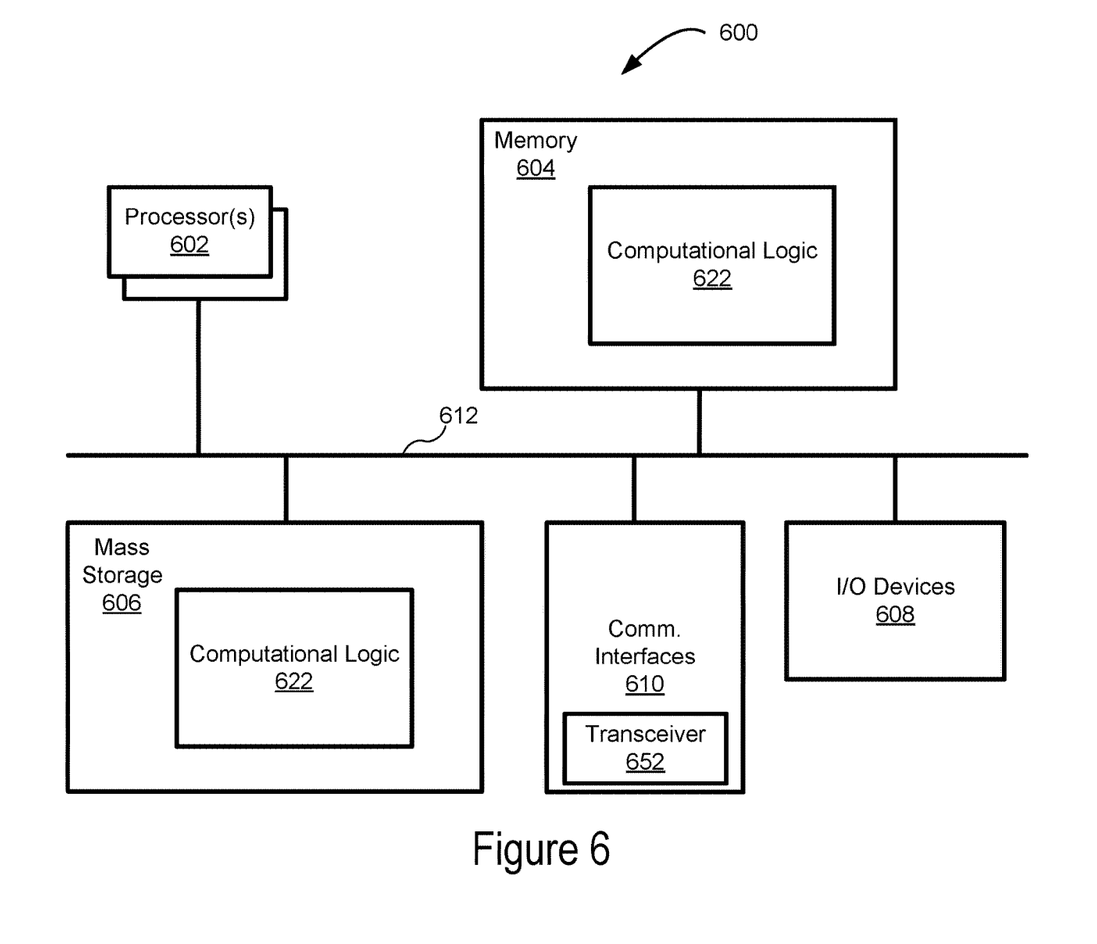
FIG. 6 is a block diagram of an example computing device, in accordance with various embodiments.

FIG. 6 illustrates a block diagram of an example computing device 600 suitable for use with various components of FIG. 1, FIGS. 3-4, and the technique 500 of FIG. 5, in accordance with various embodiments. For example, the computing device 600 may be, or may include or otherwise be coupled to, first electronic device 102, second electronic device 104, first transceiver 106, second transceiver 108, first transmitter 116, second transmitter 120, first receiver 118, second receiver 122, first processor 112, second processor 114, transmitter 300, and/or receiver 400. As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as a central processing unit (CPU), a microprocessor, and the like. The processor 602 may be implemented as an integrated circuit having multi-cores, e.g., a multi-core microprocessor. The computing device 600 may include mass storage devices 606 (such as diskette, hard drive, volatile memory (e.g., dynamic random-access memory (DRAM), compact disc read-only memory (CD-ROM), digital versatile disk (DVD), and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 600 may further include I/O devices 608 (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth).

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments. In some embodiments, the communication interfaces 610 may be, may include, and/or may be coupled with inputs 301/302/30n and/or outputs 401/402/40n. In various embodiments, the communication interfaces 610 may include a transceiver 652. In some embodiments, the transceiver 652 may be configured similarly to the first transceiver 106 and/or the second transceiver 108 described with respect to FIG. 1. In some embodiments, the transceiver 652 may be coupled with other components of the computer device 600 and/or may not be included within the communication interfaces 610.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions for the operation of various components of computing device 600, including but not limited to an operating system of computing device 600 and/or one or more applications. The various elements may be implemented by assembler instructions supported by processor(s) 602 or high-level languages that may be compiled into such instructions.

The permanent copy of the programming instructions may be placed into mass storage devices 606 in the factory, or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 604 may include computational logic 622 configured to implement various firmware and/or software services associated with operations of the computing device 600. For some embodiments, at least one of processors 602 may be packaged together with computational logic 622 configured to practice aspects of embodiments described herein to form a System in Package (SiP) or a System on Chip (SoC).

In various implementations, the computing device 600 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 600 may be any other electronic device that processes data.

Figure 7:
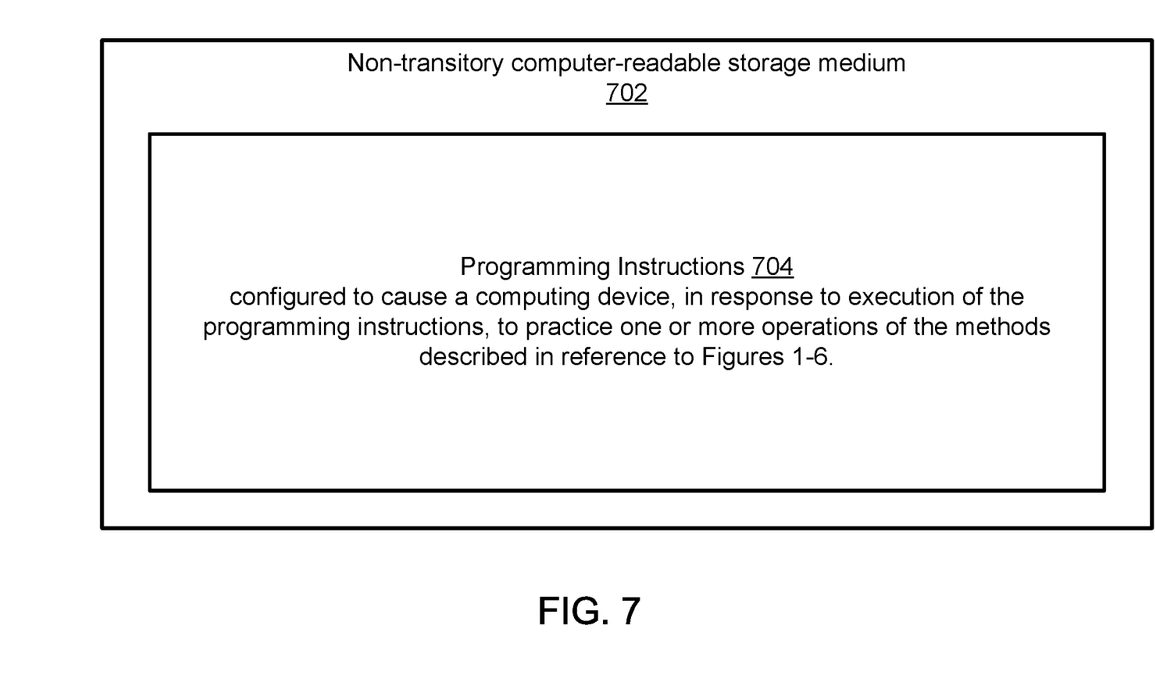
FIG. 7 illustrates an example storage medium with instructions configured to enable an apparatus to practice various aspects of the present disclosure, in accordance with various embodiments.

FIG. 7 illustrates example computer-readable storage medium 702 having instructions configured to practice all or selected ones of the operations associated with the computer device 600, earlier described with respect to FIG. 6; the first electronic device 102, the second electronic device 104, including the first transceiver 106, the second transceiver 108, the first processor 112, and/or the second processor 114 described with respect to FIG. 1; the transmitter 300, including the logic circuitry 360 described with respect to FIG. 3; the receiver 400, including the logic circuitry 470 described with respect to FIG. 4; and/or the technique of FIG. 5, in accordance with various embodiments. As illustrated, computer-readable storage medium 702 may include a number of programming instructions 704. The storage medium 702 may represent a broad range of non-transitory persistent storage medium known in the art, including but not limited to flash memory, dynamic random access memory, static random access memory, an optical disk, a magnetic disk, etc. Programming instructions 704 may be configured to enable a device, e.g., computer device 600, first electronic device 102, and/or second electronic device 104 in response to execution of the programming instructions 704, to perform, e.g., but not limited to, various operations described for the logic circuitry 360, the logic circuitry 470, the computer device 600 of FIG. 6, or operations shown and/or described with respect to technique 500 of FIG. 5. In alternate embodiments, programming instructions 704 may be disposed on multiple computer-readable storage media 702. In alternate embodiment, storage medium 702 may be transitory, e.g., signals encoded with programming instructions 704.

Referring back to FIG. 6, for an embodiment, at least one of processors 602 may be packaged together with memory having all or portions of computational logic 622 configured to practice aspects shown or described for the system 100 shown in FIG. 1, transmitter 300 of FIG. 3, receiver 400 of FIG. 4, or operations shown or described with respect to technique 500 of FIG. 5. For an embodiment, at least one of processors 602 may be packaged together with memory having all or portions of computational logic 622 configured to practice aspects described for the system 100 shown in FIG. 1, transmitter 300 of FIG. 3, receiver 400 of FIG. 4, or operations shown or described with respect to technique 500 of FIG. 5 to form a System in Package (SiP). For an embodiment, at least one of processors 602 may be integrated on the same die with memory having all or portions of computational logic 622 configured to practice aspects described for the system 100 shown in FIG. 1, transmitter 300 of FIG. 3, receiver 400 of FIG. 4, or operations shown or described with respect to technique 500 of FIG. 5. For an embodiment, at least one of processors 602 may be packaged together with memory having all or portions of computational logic 622 configured to practice aspects of the system 100 shown in FIG. 1, transmitter 300 of FIG. 3, receiver 400 of FIG. 4, or operations shown or described with respect to technique 500 of FIG. 5 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include a transmitter to transmit a radio frequency (RF) signal to a receiver via a dielectric waveguide, the transmitter comprising: a plurality of mixers, respective ones of the plurality of mixers to generate a modulated RF signal based at least in part on a data signal input and a local oscillator signal input specific to the mixer, wherein each of the modulated RF signals is in a channel having a frequency band that does not overlap with the other modulated RF signals; and a combiner to combine the modulated RF signals from the respective ones of the plurality of mixers into a combined RF signal for transmission over the dielectric waveguide, wherein the combined RF signal has a frequency range from a lower frequency greater than or equal to approximately 30 gigahertz (GHz) to an upper frequency less than approximately 1 terahertz (THz).

Example 2 may include the subject matter of Example 1, further comprising a local oscillator (LO) synthesizer to synthesize the local oscillator signals used by the respective ones of the plurality of mixers.

Example 3 may include the subject matter of Example 2, wherein the LO synthesizer is a programmable LO synthesizer.

Example 4 may include the subject matter of Example 3, further comprising a controller coupled with the programmable LO synthesizer, wherein the controller is to direct the LO synthesizer to generate a number of frequencies based at least in part on a total group delay over an available frequency bandwidth, wherein the number of channels for modulated RF signal transmission is equal to the number of frequencies generated by the LO synthesizer.

Example 5 may include the subject matter of any one of Examples 1-4, wherein the frequency band of each channel is separated from the frequency bands of any adjacent channels by a frequency guard band.

Example 6 may include the subject matter of any one of Examples 1-5, wherein a first channel has a frequency bandwidth approximately equal to a second channel and the number of channels is less than or equal to five.

Example 7 may include the subject matter of any one of Examples 1-6, wherein the upper frequency is less than or equal to approximately 300 GHz.

Example 8 may include a receiver to receive, from a dielectric waveguide, a radio frequency (RF) signal, the receiver comprising: a demultiplexer to demultiplex the RF signal into a plurality of filtered RF signals based at least in part on a plurality of channels, each channel having a frequency band that does not overlap with the other channels, wherein the RF signal is to have a frequency range from a lower frequency greater than or equal to approximately 30 gigahertz (GHz) to an upper frequency less than approximately 1 terahertz (THz); and a plurality of demodulators, respective ones of the plurality of demodulators to demodulate a filtered RF signal from the plurality of filtered RF signals based at least in part on a local oscillator (LO) signal.

Example 9 may include the subject matter of Example 8, wherein the demultiplexer includes: a splitter to split the RF signal into a plurality of RF signal paths; and a plurality of filters, respective ones of the plurality of filters to receive an RF signal from one of the RF signal paths and filter the RF signal based at least in part on one of the plurality of channels to produce a filtered RF signal of the plurality of filtered RF signals.

Example 10 may include the subject matter of any one of Examples 8-9, further comprising a LO synthesizer to synthesize the LO signals used by the plurality of demodulators.

Example 11 may include the subject matter of Example 9, wherein the plurality of filters are programmable.

Example 12 may include the subject matter of Example 11, further comprising a controller coupled with the programmable filters, wherein the controller is to direct respective ones of the plurality of programmable filters to allow RF signals in a channel frequency range having a lower frequency and an upper frequency specified by the controller to pass through the programmable filter.

Example 13 may include the subject matter of any one of Examples 8-12, wherein the frequency band of each channel is separated from the frequency bands of any adjacent channels by a frequency guard band.

Example 14 may include the subject matter of any one of Examples 8-13, wherein a first channel has a frequency bandwidth approximately equal to a second channel.

Example 15 may include a dielectric waveguide communication apparatus comprising: a transmitter that includes: a plurality of mixers, respective ones of the plurality of mixers to generate a modulated radio frequency (RF) signal in a transmission channel having a frequency band that does not overlap with the other transmission channels; a combiner to combine the modulated RF signals from the respective ones of the plurality of mixers into a combined modulated RF signal for transmission over a dielectric waveguide; a receiver that includes: a demultiplexer to demultiplex a received RF signal into a plurality of filtered RF signals based at least in part on a plurality of reception channels, each reception channel having a frequency band that does not overlap with the other reception channels; and a plurality of demodulators, respective ones of the plurality of demodulators to demodulate a filtered signal from the plurality of filtered RF signals; and a waveguide interface coupled with the transmitter and the receiver.

Example 16 may include the subject matter of Example 15, wherein the waveguide interface is to allow the transmitter and the receiver to simultaneously transmit and receive.

Example 17 may include the subject matter of any one of Examples 15-16, wherein the frequency band of each transmission channel is separated from the frequency bands of any adjacent transmission channels by a frequency guard band.

Example 18 may include the subject matter of any one of Examples 15-17, wherein the transmission channels and the reception channels are in a frequency range between approximately 30 gigahertz (GHz) and approximately 1 terahertz (THz).

Example 19 may include the subject matter of Example 18, wherein the transmission channels and the reception channels are in a frequency range between approximately 30 GHz and approximately 300 GHz.

Example 20 may include the subject matter of any one of Examples 15-19, further comprising: a programmable local oscillator (LO) synthesizer coupled with the plurality of mixers; and a controller coupled with the programmable LO synthesizer, wherein the controller is to direct the LO synthesizer to generate a number of frequencies based at least in part on a total group delay over an available frequency bandwidth, wherein the number of transmission channels is equal to the number of frequencies generated by the LO synthesizer.

Example 21 may include the subject matter of any one of Examples 15-20, further comprising a processor coupled with the transmitter and the receiver, wherein the processor is to provide data to the transmitter for transmission over the dielectric waveguide and receive data from the receiver based at least in part on the demodulated RF signals.

Example 22 may include the subject matter of any one of Examples 15-21, wherein the demultiplexer includes: a splitter to split the received RF signal into a plurality of RF signal paths; and a plurality of filters, respective ones of the plurality of filters to receive an RF signal from one of the RF signal paths and filter the RF signal based at least in part on one of the plurality of reception channels to produce a filtered RF signal of the plurality of filtered RF signals.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

We claim:

1. A dielectric waveguide communication apparatus comprising:
    a transmitter that includes:
        a modulated RF signal generator to generate a plurality of modulated RF signals, respective ones of the plurality of modulated RF signals in a corresponding channel having a frequency band that does not overlap with the other modulated RF signals, wherein the transmitter is to test a dielectric waveguide and the modulated RF signal generator is to generate the plurality of modulated RF signals based at least in part on the test of the dielectric waveguide; and
        a combiner to combine the plurality of modulated RF signals into a combined RF signal for transmission over the dielectric waveguide, wherein the combined RF signal has a frequency range from a lower frequency greater than or equal to approximately 30 gigahertz (GHz) to an upper frequency less than approximately 1 terahertz (THz); and
    a waveguide interface coupled with the transmitter.

2. The dielectric waveguide communication apparatus of claim 1, wherein the frequency band of each channel is separated from the frequency bands of any adjacent channels by a frequency guard band.

3. The dielectric waveguide communication apparatus of claim 1, wherein a first channel has a frequency bandwidth approximately equal to a second channel and a number of channels is less than or equal to five.

4. The dielectric waveguide communication apparatus of claim 1, wherein the modulated RF signal generator includes a plurality of mixers, respective ones of the plurality of mixers to generate the plurality of modulated RF signals.

5. The dielectric waveguide communication apparatus of claim 1, further comprising a receiver coupled with the waveguide interface.

6. The dielectric waveguide communication apparatus of claim 5, wherein the combined RF signal is a first combined RF signal, and wherein the receiver includes:
    a demultiplexer to demultiplex a second combined RF signal into a plurality of filtered RF signals based at least in part on a plurality of channels, each channel of the plurality of channels having a frequency band that does not overlap with the other channels of the plurality of channels, wherein the second combined RF signal is to have a frequency range from a lower frequency greater than or equal to approximately 30 gigahertz (GHz) to an upper frequency less than approximately 1 terahertz (THz); and
    a plurality of demodulators, respective ones of the plurality of demodulators to demodulate a filtered RF signal from the plurality of filtered RF signals based at least in part on a local oscillator (LO) signal.

7. The dielectric waveguide communication apparatus of claim 6, wherein the demultiplexer includes:
    a splitter to split the second combined RF signal into a plurality of RF signal paths; and
    a plurality of filters, respective ones of the plurality of filters to receive an RF signal from one of the RF signal paths and filter the received RF signal based at least in part on one of the plurality of channels to produce a filtered RF signal of the plurality of filtered RF signals.

8. The dielectric waveguide communication apparatus of claim 7, wherein the plurality of filters are programmable.

9. The dielectric waveguide communication apparatus of claim 8, further comprising a controller coupled with the programmable filters, wherein the controller is to direct respective ones of the plurality of programmable filters to allow RF signals in a channel frequency range having a lower frequency and an upper frequency specified by the controller to pass through the programmable filter.

10. The dielectric waveguide communication apparatus of claim 6, wherein the receiver further comprises a LO synthesizer to synthesize the LO signals used by the plurality of demodulators.

11. A transmitter to transmit a radio frequency (RF) signal to a receiver via a dielectric waveguide, the transmitter comprising:
- a programmable local oscillator (LO) synthesizer to synthesize a plurality of LO signals based at least in part on a test of the dielectric waveguide;
- a modulated RF signal generator to generate a plurality of modulated RF signals, respective ones of the plurality of modulated RF signals in a corresponding channel having a frequency band that does not overlap with the other modulated RF signals, wherein the modulated RF signal generator is to generate the plurality of modulated RF signals based at least in part on the plurality of LO signals; and
- a combiner to combine the plurality of modulated RF signals into a combined RF signal for transmission over the dielectric waveguide, wherein the combined RF signal has a frequency range from a lower frequency greater than or equal to approximately 30 gigahertz (GHz) to an upper frequency less than approximately 1 terahertz (THz).

12. The transmitter of claim 11, wherein the frequency band of each channel is separated from the frequency bands of any adjacent channels by a frequency guard band.

13. The transmitter of claim 11, wherein a first channel has a frequency bandwidth approximately equal to a second channel and the number of channels is less than or equal to five.

14. The transmitter of claim 11, wherein the modulated RF signal generator includes a plurality of mixers, respective ones of the plurality of mixers to generate plurality of modulated RF signals.

15. A receiver to receive, from a transmitter via a dielectric waveguide, a radio frequency (RF) signal, the receiver comprising:
- a splitter to separate the RF signal into a plurality of filtered RF signals, wherein the RF signal is to have a frequency range from a lower frequency greater than or equal to approximately 30 gigahertz (GHz) to an upper frequency less than approximately 1 terahertz (THz);
- a local oscillator synthesizer to synthesize a plurality of local oscillator (LO) signals based at least in part on a characteristic of the dielectric waveguide obtained by a test performed by the transmitter; and
- a plurality of demodulators to demodulate the plurality of filtered RF signals based at least in part on the plurality of LO signals, respective ones of the plurality of filtered RF signals in a corresponding channel having a frequency band that does not overlap with the other filtered RF signals.

16. The receiver of claim 15, wherein the characteristic of the dielectric waveguide includes one or more channelization scheme parameters.

17. The receiver of claim 16, wherein the one or more channelization scheme parameters are indicated in a header of a transmission protocol.

18. The receiver of claim 15, further comprising one or more filters, wherein the splitter to separate the RF signal into the plurality of filtered RF signals is to separate the RF signal using the one or more filters.

19. The receiver of claim 15, wherein the plurality of demodulators to demodulate the plurality of filtered RF signals is to generate a plurality of output data signals based at least in part on the plurality of LO signals and a clock and data recovery circuit.

* * * * *